(12) United States Patent
Matsuno et al.

(10) Patent No.: US 12,575,551 B2
(45) Date of Patent: Mar. 17, 2026

(54) CONTROLLER CAPABLE OF REMOTELY OPERATING ELECTRIC FISHING REEL

(71) Applicant: GLOBERIDE, Inc., Higashikurume (JP)

(72) Inventors: Keisuke Matsuno, Higashikurume (JP); Ken Mizuhara, Higashikurume (JP); Shuta Kano, Higashikurume (JP)

(73) Assignee: GLOBERIDE, INC, Tokyo (JP)

( * ) Notice: Subject to any disclaimer, the term of this patent is extended or adjusted under 35 U.S.C. 154(b) by 0 days.

(21) Appl. No.: 18/903,146

(22) Filed: Oct. 1, 2024

(65) Prior Publication Data

US 2025/0228229 A1 Jul. 17, 2025

(30) Foreign Application Priority Data

Jan. 17, 2024 (JP) ................................. 2024-005242

(51) Int. Cl.
*A01K 89/012* (2006.01)
*A01K 99/00* (2006.01)

(52) U.S. Cl.
CPC ............ *A01K 99/00* (2013.01); *A01K 89/012* (2013.01)

(58) Field of Classification Search
CPC .............................. A01K 89/012; A01K 99/00
See application file for complete search history.

(56) References Cited

U.S. PATENT DOCUMENTS 7,108,213 B2 * 9/2006 Hitomi ................. A01K 89/015
33/732
2015/0335001 A1 * 11/2015 Miyamae ............. A01K 89/017
242/250

FOREIGN PATENT DOCUMENTS

| CN | 102550510 A | 7/2012 |
|---|---|---|
| CN | 115606558 A | 1/2023 |
| JP | 2005-218354 A | 8/2005 |
| JP | 2021-145672 A | 9/2021 |

OTHER PUBLICATIONS

Jun. 16, 2025 Office Action issued in Taiwanese Patent Application No. 113150780.

* cited by examiner

*Primary Examiner* — Richard G Davis
(74) *Attorney, Agent, or Firm* — OLIFF PLC

(57) ABSTRACT

A housing of a controller has a grip portion that can be gripped with one hand, and the housing is provided with a display device and an operation member that enables a user to remotely operate an electric fishing reel.

14 Claims, 15 Drawing Sheets

FIG. 6D    FIG. 6B    FIG. 6C

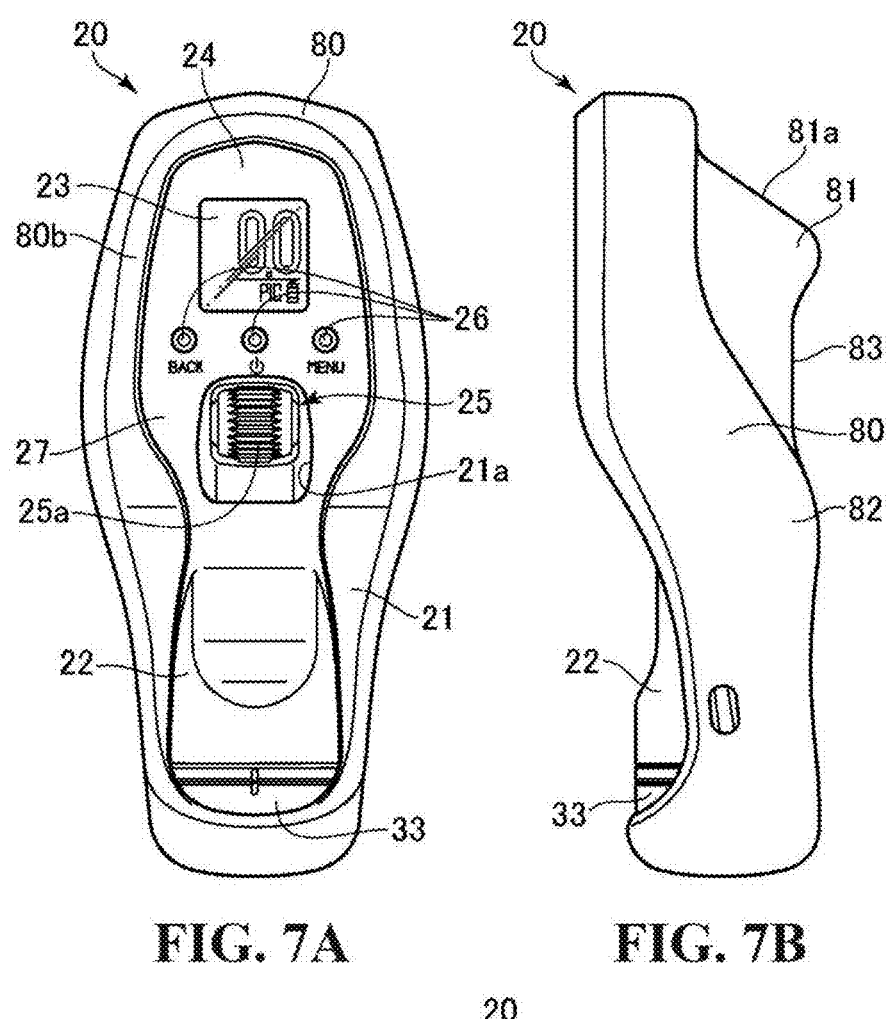
FIG. 7A          FIG. 7B
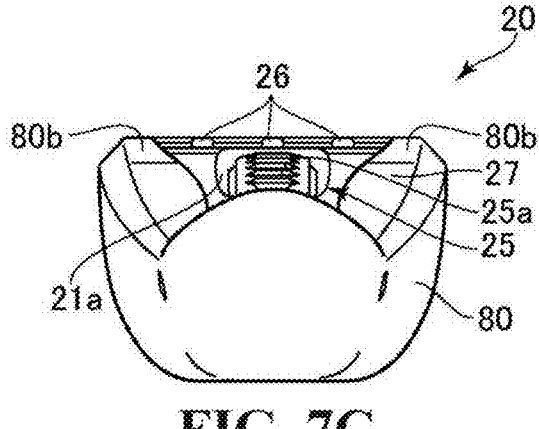
FIG. 7C

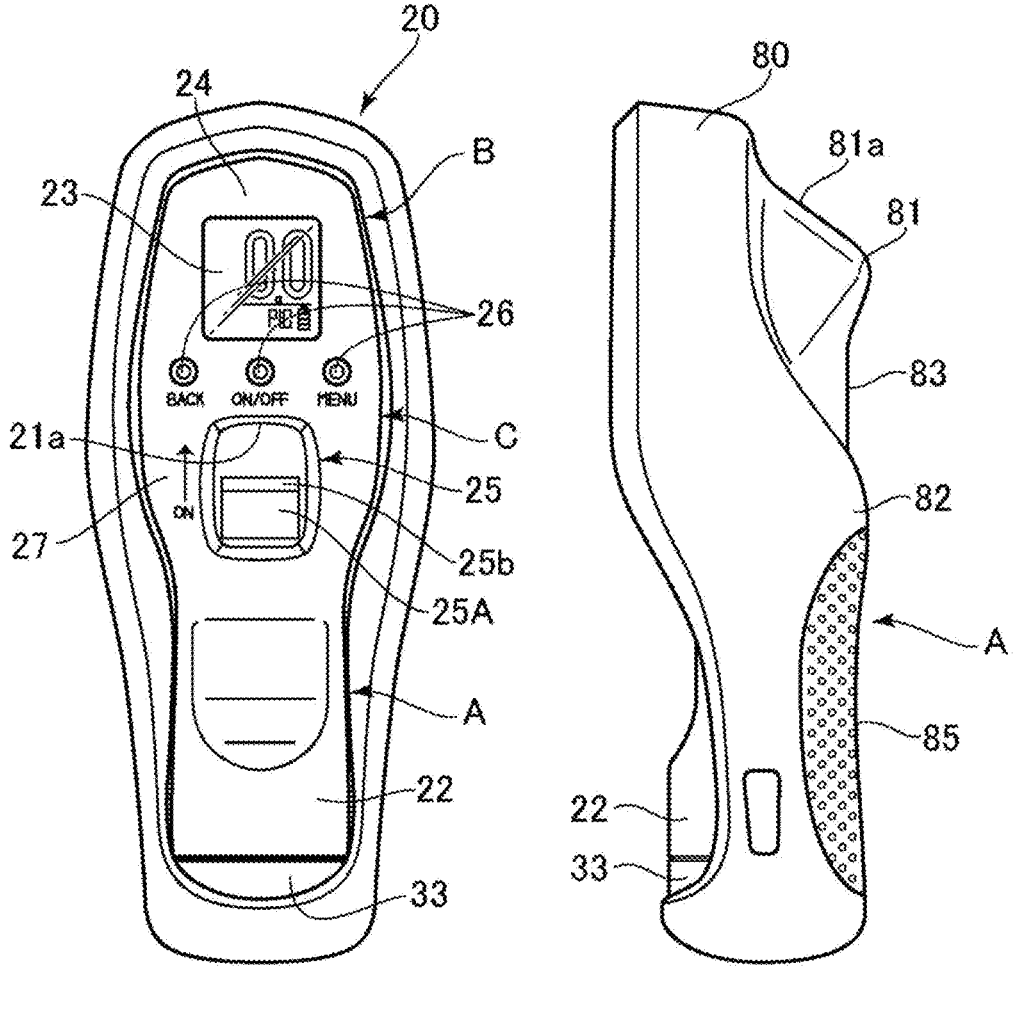
FIG. 11A          FIG. 11B

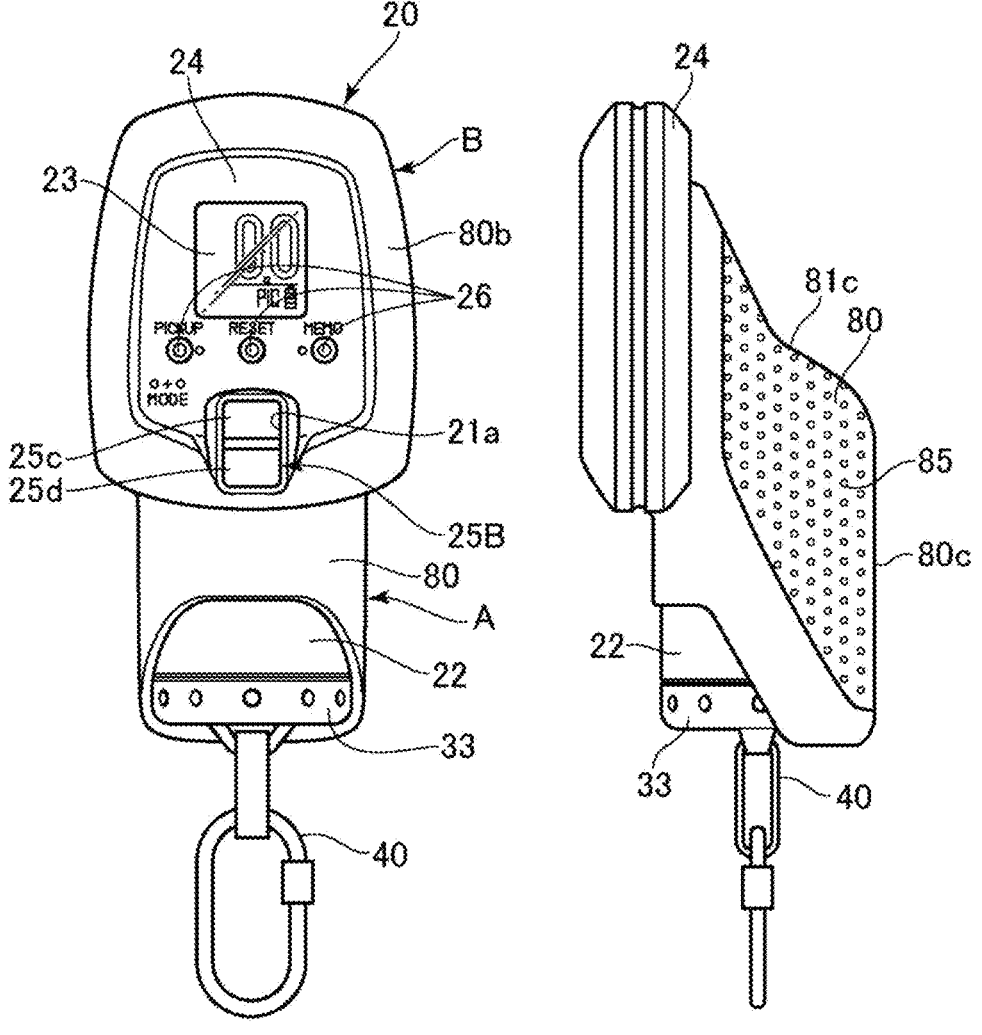
FIG. 12A          FIG. 12B

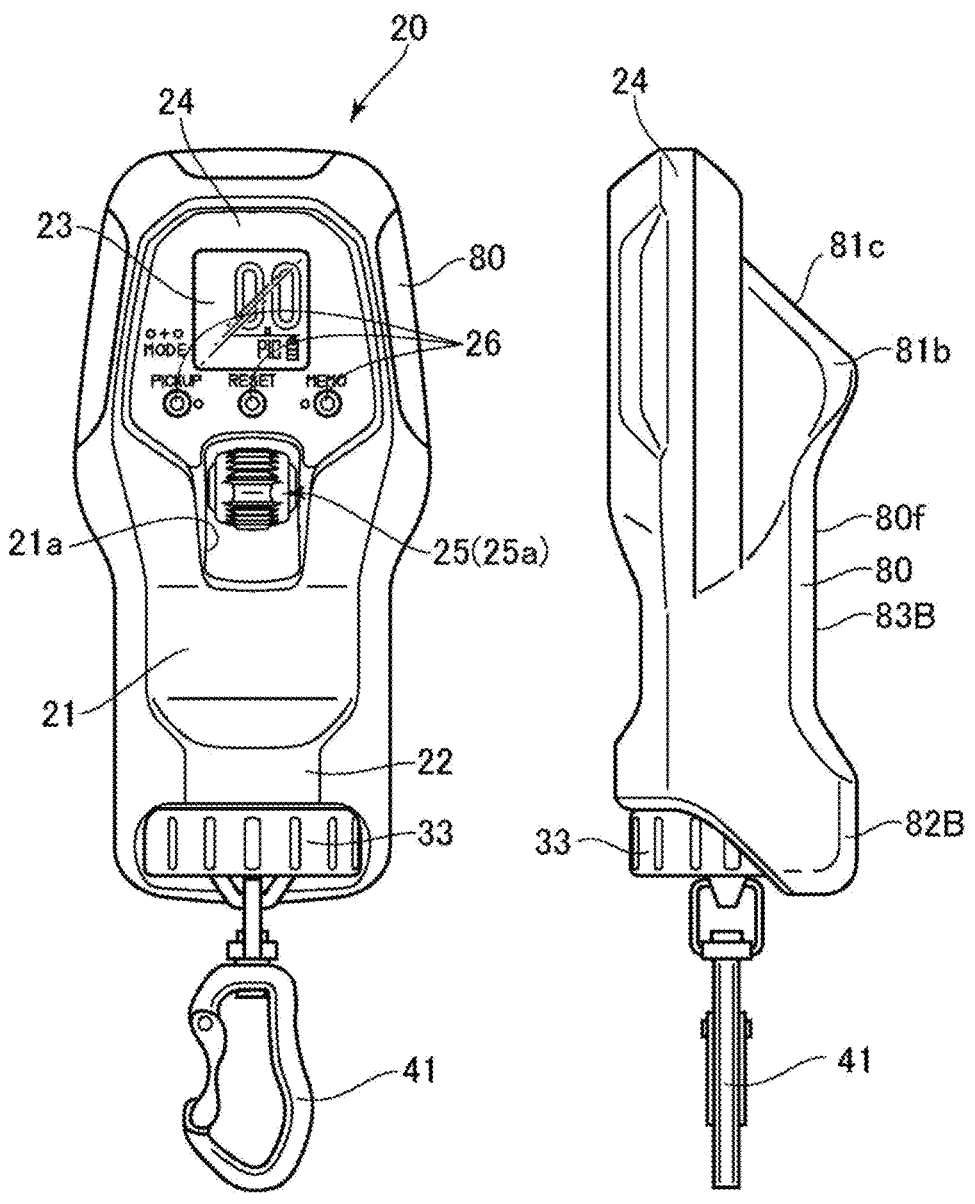
FIG. 14A        FIG. 14B

CONTROLLER CAPABLE OF REMOTELY OPERATING ELECTRIC FISHING REEL

CROSS-REFERENCE TO RELATED APPLICATION

This application claims priority under 35 U.S.C. § 119 to Japanese Patent Application No. 2024-005242 filed on Jan. 17, 2024 in the Japanese Patent Office, the entire contents of each hereby incorporated by reference.

BACKGROUND OF THE INVENTION

1. Technical Field

The present invention relates to a controller capable of remotely operating an electric fishing reel in which a fishing line is wound around a spool by output from a drive motor supported on a reel main body.

2. Description of the Related Art

For example, as disclosed in JP 2005-218354 A, a configuration has been heretofore known which enables an electric fishing reel to be remotely operated using a controller. Transmission/reception units are respectively provided on sides of the controller and a reel main body so as to enable bidirectional communication, and a housing of the controller is provided with a button-type operation switch that transmits an operation signal to the reel main body side and a display device that displays information indicating an operation state from the reel main body side.

Meanwhile, J P 2021-145672 A discloses a configuration which displays information on a screen of a smartphone and remotely operates a reel main body by downloading application software dedicated to the smartphone.

SUMMARY OF THE INVENTION

The controller disclosed in JP 2005-218354 A described above remotely operates the reel main body by pressing the operation switch disposed below the display device. The operation switch as described above needs to be pressed continuously, which makes remote operation difficult. In addition, since the configuration disclosed in JP 2021-145672 A is operated by the smartphone, it is necessary to perform a touch operation while viewing a display screen at the time of operation, which makes remote operation difficult as in JP 2005-218354 A.

The present invention has been made in view of the above problems, and an object thereof is to provide a controller that facilitates remote operation of an electric fishing reel.

In order to achieve the above object, the present invention provides a controller capable of remotely operating an electric fishing reel, the controller being characterized in that the controller comprises a housing comprising a grip portion that can be gripped by a user, and the housing is provided with a display device and an operation member that enables the user to remotely operate the electric fishing reel.

The housing of the controller according to the present invention comprises the grip portion that can be gripped by the user with one hand, and the controller is configured to be able to adjust output of a drive motor on an electric reel main body side by operating the operation member with a thumb in a state of gripping the grip portion. In other words, since the output of the drive motor can be adjusted by operating the operation member with the thumb while gripping the housing, it is not necessary to perform the operation while viewing the display device, and thus the controller that enables easy remote operation can be obtained.

Further, in one embodiment, the operation member of the controller is constituted by any one of a rotating body, a slide body, and a swing body, and the output of the drive motor can be adjusted only by shifting a thumb in a certain direction while pressing the thumb. Thus, the output of the drive motor can be adjusted without performing a pressing operation multiple times or performing an operation while viewing a screen as in a conventional press button or a screen of a smartphone.

For example, when the operation member is a rotating body, it is only required to perform an operation of rotating (rolling) the rotating body by pressing the abdomen of the thumb against the surface (operating part). In such a configuration, the output of the drive motor can be adjusted according to the amount of rotation of the rotating body. Meanwhile, when the operation member is a slide body, it is only required to perform an operation of sliding the slide body by pressing the abdomen of the thumb against the surface (operating part). For example, by sliding the slide body in a certain direction in a state where the slide body is at the initial position (the output of the drive motor is zero), the output of the drive motor can be adjusted according to the amount of movement of the slide body. Meanwhile, when the operation member is a swing body, for example, the operation member is set to be swingably supported so as to be displaced to the on-side or the off-side of the drive motor, and the output of the drive motor can be adjusted by pressing the abdomen of the thumb to displace the swing body to the on-side or the off-side.

As described above, since the output of the drive motor can be adjusted only by displacing the position of the thumb (rotational movement or linear movement) on the operation member, the output of the drive motor can be adjusted with the sense of the amount of operation (the amount of movement) of the thumb without looking at the operation member while gripping the housing, and thus the operability can be improved. In addition, the output of the drive motor can be adjusted while viewing the state of the rod tip.

As described above, according to the present invention, it is possible to obtain a controller that facilitates remote operation of an electric fishing reel.

BRIEF DESCRIPTION OF THE DRAWINGS

FIGS. 6A to 6D are views illustrating a configuration example of a cover member that covers the controller, in which FIG. 6A is a perspective view, FIG. 6B is a plan view, FIG. 6C is a right side view, and FIG. 6D is a left side view;

FIGS. 7A to 7C are views illustrating a state where the cover member is attached to the controller, in which FIG. 7A is a perspective view, FIG. 7B is a right side view, and FIG. 7C is a rear view;

FIGS. 10A to 10E are views illustrating a controller and a cover member according to a second embodiment, in which FIG. 10A is a plan view, FIG. 10B is a rear view, FIG. 10C is a left side view, FIG. 10D is a front view, and FIG. 10E is a rear view;

FIGS. 11A and 11B are views illustrating a controller and a cover member according to a third embodiment, in which FIG. 11A is a plan view and FIG. 11B is a right side view;

FIGS. 12A and 12B are views illustrating a controller and a cover member according to a fourth embodiment, in which FIG. 12A is a plan view and FIG. 12B is a right side view;

FIGS. 13A and 13B are views illustrating a controller and a cover member according to a fifth embodiment, in which FIG. 13A is a plan view and FIG. 13B is a right side view;

FIGS. 14A and 14B are views illustrating a controller and a cover member according to a sixth embodiment, in which FIG. 14A is a plan view and FIG. 14B is a right side view.

DETAILED DESCRIPTION

Hereinafter, an embodiment of an electric fishing reel and various embodiments of a controller according to the present invention will be described. Note that, in the following description, a front-rear direction (axial direction) and a left-right direction (width direction) of the controller are defined by directions illustrated in FIG. 1. In addition, an up-down direction is defined by a direction illustrated in FIG. 4E.

FIGS. 1 to 9 are views illustrating a first embodiment.

The electric fishing reel and the controller according to the present embodiment are configured to be able to remotely adjust the driving state of a drive motor of an electric fishing reel easily by operating the controller under a situation where a fishing person cannot operate the electric fishing reel directly or under a situation where the fishing person is away from the electric fishing reel, such as a state where the fishing person is away from a position at which a fishing rod is installed on a rod hook, a state where the fishing person (captain) who operates a fishing boat is in a cabin while leaving the fishing rod behind, and a state where the fishing person (fisherman) is performing another operation while leaving the fishing rod behind.

Therefore, the controller may be held by the fishing person at all times, or may be placed on another object (e.g. an article) such as a ship edge, a seat, or a cooler box. Alternatively, the controller may be provided with a strap or the like and used by being hooked on a structure of a ship (columns, protrusions, etc.).

Figure 1:
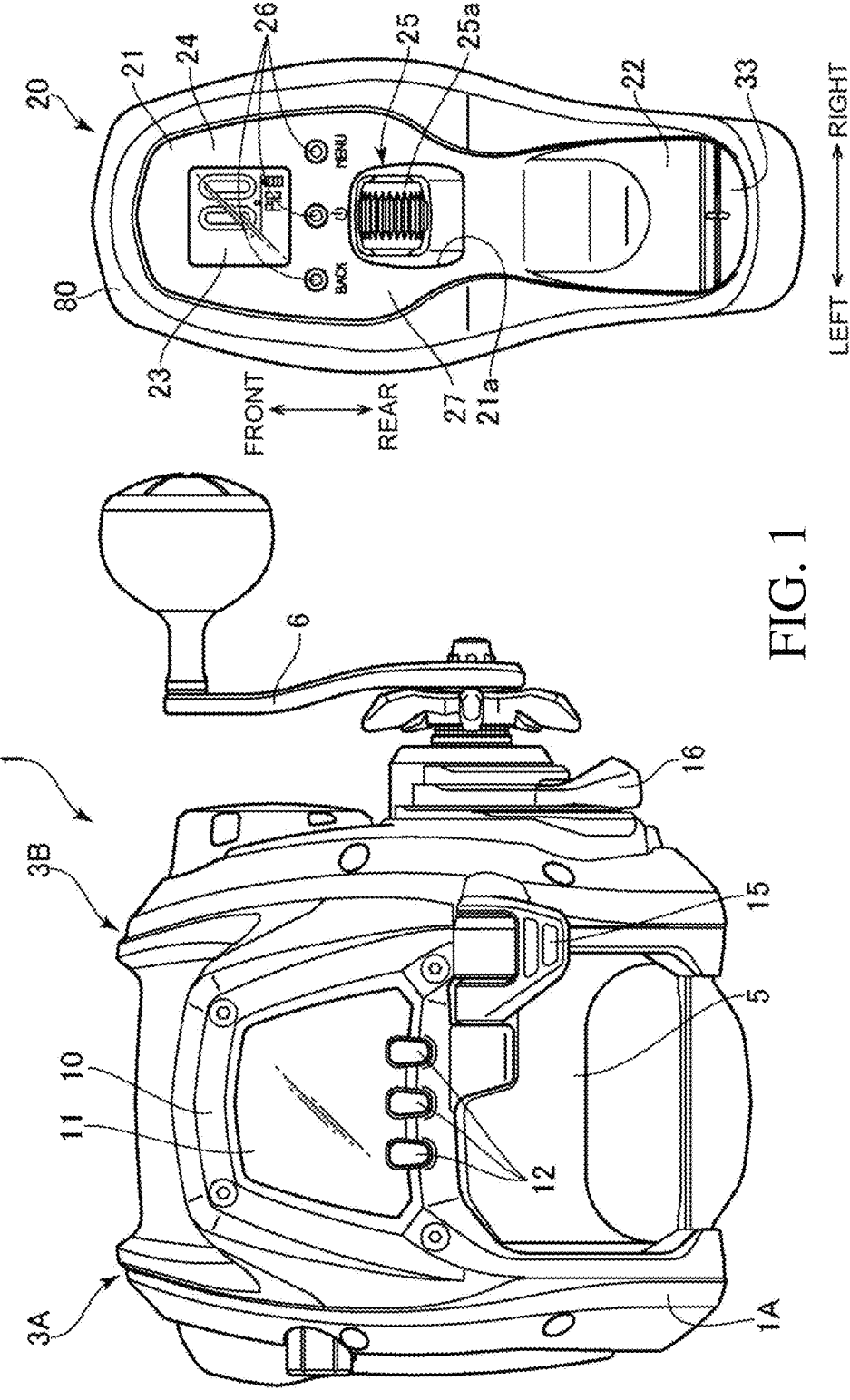
FIG. 1 is a view illustrating an embodiment of an electric fishing reel and a controller according to the present invention.

FIG. 1 is a view illustrating a first embodiment of an electric fishing reel and a controller.

A reel main body 1A of an electric fishing reel 1 of the present embodiment comprises left and right side plates 3A and 3B, and a spool 5 around which a fishing line is wound is rotatably supported between the left and right side plates 3A and 3B.

A manual handlebar 6 through which a winding operation is performed is provided on one side plate (right side plate 3B) side of the left and right side plates, and is configured to enable the winding operation of the spool 5 via a known power transmission mechanism. Further, in the present embodiment, a drive motor (not illustrated) is held between the left and right side plates 3A and 3B at a position on the front side of the spool 5. The spool 5 is rotationally driven in a fishing line winding direction by the winding operation of the manual handlebar 6 and the rotational drive of the drive motor.

A box-shaped control case 10 housing a control unit that controls the drive motor is disposed above the spool 5 located between the left and right side plates 3A and 3B. A display device (display unit using a liquid crystal or the like) 11 for displaying a line length (water depth), time, a mode, and the like, and button type (or touch type) operation buttons 12 for setting various modes are arranged on a front surface side of the control case 10.

Further, an operation member 15 that adjusts output of the drive motor is disposed in a rear portion of the control case 10. The operation member 15 of the present embodiment has a lever form provided on a support shaft rotatably supported on a right side plate side at a position behind the control case 10, and is configured to adjust the output of the drive motor by rotating the operation member (operation lever) 15 in the front-rear direction.

In addition, a known clutch mechanism that switches the spool 5 to a fishing line winding state/free rotation state is arranged on one side plate (right side plate 3B) side. This clutch mechanism has a function of connecting and disconnecting power transmission from the manual handlebar 6 and the drive motor to the spool 5, and is configured to switch from a clutch-ON state to a clutch-OFF state by a clutch operation member 16 that is disposed on the right side plate 3B side so as to be displaceable in the front-rear direction. In this case, when the clutch operation member 16 is rotated forward in the clutch-ON state (power transmission state) illustrated in FIG. 1, the clutch mechanism switches to the clutch-OFF state.

Note that, returning from the clutch-OFF state to the clutch-ON state can be automatically performed by an operation of the clutch operation member 16 in the reverse direction, the winding operation of the manual handlebar 6, and driving of the drive motor, for example.

As is known, the electric fishing reel 1 comprising the above-described configuration is mounted on a fishing rod, and is ready for use by fixing the fishing rod to a rod hook member (rod keeper) fixed to a ship edge. Specifically, a rig is cast in the sea with the clutch mechanism turned off, and the clutch is turned on when the rig reaches a predetermined shelf (the clutch is turned on automatically or manually). When a fish is caught in this state, the operation member 15 is rotated to drive the drive motor while adjusting the speed, thus winding a fishing line around the spool 5. In this case, in the electric fishing reel 1, as described above, even when the fishing person is away from the position of the fishing rod, it is possible to remotely operate the drive motor by a controller 20.

In the controller 20, in a housing 21 comprising a grip portion 22 that can be gripped with one hand, a display device (display unit such as liquid crystal) 23 that is visible when a user grips the grip portion 22 is provided.

In addition, the housing 21 is provided with an operation member 25 capable of adjusting (remotely operating) the output of the drive motor on the reel main body 1A side with a thumb in a state where the user grips the grip portion 22.

The display device 23 displays the same information as information displayed on the display device 11 on the reel main body side, including water depth information. Besides the above information, it is also possible to display time (current time, winding time, etc.), a communication radio wave state, and the like, and also possible to display individual information on the controller side, such as a remaining battery level and a motor output value of an operation dial. In addition, the housing 21 is provided with operation buttons 26 besides the operation member 25. These operation buttons 26 can be arranged at any position of the housing 21, and in the present embodiment, the multiple operation buttons are arranged between the display device 23 and the operation member 25. The operation buttons 26 of the present embodiment comprises an ON/OFF button of the controller, a menu button for setting various menus, and a Back button used when canceling (returning) in the menu.

The operation member 25 of the present embodiment is configured as a rotating body. Specifically, the operation member is configured in a dial shape capable of rolling operation by pressing it with a thumb (hereinafter also referred to as an operation dial 25). The operation dial 25 comprises an operating part 25a having a substantially columnar shape at the center of a support shaft, and both sides of the support shaft are rotatably supported with respect to the housing 21. The operating part 25a is exposed from a substantially rectangular opening 21a formed in a central portion of the housing 21, and is rotationally driven by pushing up/pushing down (sliding) the operating part 25a along the up-down direction while pressing it with a thumb.

Note that, for example, the operating part 25a preferably has protrusions and depressions such as a large number of grooves and knurls along the axial direction as in the present embodiment so as to increase the frictional force and not to slip during operation.

In addition, since the controller 20 is used on a ship, the controller may collide with other objects or seawater may enter inside it. For this reason, it is preferable that at least a cover member 80 from which the display device 23 and the operation member 25 are exposed be mounted on the housing 21.

Specific configurations of the controller 20 and the cover member 80 described above will be described later.

Figure 2:
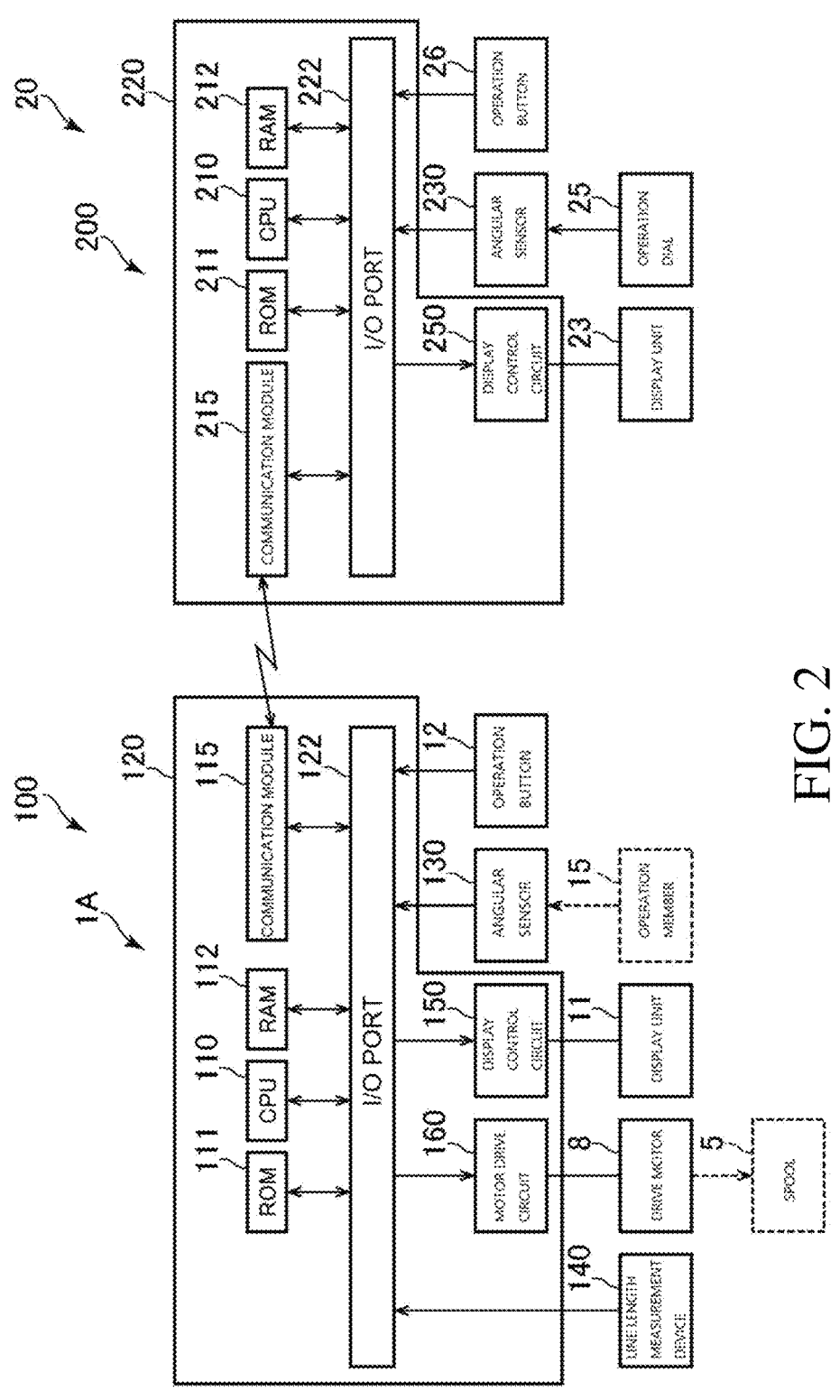
FIG. 2 is a block diagram illustrating a control system on a reel main body side and a control system on a controller side.

Next, a control system on the reel main body 1A side and a control system on the controller 20 side will be described with reference to a block diagram of FIG. 2.

A control unit 100 accommodated in the control case 10 of the reel main body 1A comprises a control substrate (microcomputer) 120 on which a central processing unit (CPU) 110 that controls the operation of the electric fishing reel, a read only memory (ROM) 111, a random access memory (RAM) 112 as a temporary storage area, a communication module 115 that transmits and receives various information signals to and from the controller 20, and the like are mounted.

The communication module 115 may have any system as long as it is capable of transmitting and receiving information at a short distance on the ship, and Bluetooth (registered trademark) is used, for example.

The control substrate 120 is configured to transmit and receive signals to and from each actuating element via an I/O port 122 and control the operation of each actuating element.

Operation signals of detection means, which is configured to detect the amount of operation of the operation member 15, specifically an angular sensor 130 that outputs an operation position signal according to the operation angle of the operation member 15, a line length measurement device 140 that is capable of detecting the amount of fishing line, wound around the spool 5, fed off, and the operation buttons 12 that are arranged on the control case 10 are configured to be transmitted and received to and from the control substrate 120.

Note that, a display control circuit 150 that causes the display device 11 to display various kinds of information and a motor drive circuit 160 that continuously increases and decreases the output of the drive motor 8 from a stop state to a high output value are mounted on the control substrate 120. The CPU 110 has a function of controlling each actuating element above to control the entire electric fishing reel by executing a predetermined program stored in the ROM 111 and supplying a control signal generated in response thereto to each actuating element via the I/O port 122.

The ROM 111 stores various programs to be executed by the CPU 110, for example, data (such as an arithmetic program for measuring a line length based on a detection signal input from the line length measurement device 140, a variable control table for specifying an operation angle of the operation member 15 and a duty ratio for varying a rotation speed of the drive motor 8 correspondingly, and image display data for displaying an image such as a character and a number on the display device 11) required for control processing.

In addition, the RAM 112 comprises a work area and has a function of temporarily storing processing procedures, data, and the like when the program is operating.

The operation buttons 12 accept various kinds of information from the fishing person, such as depth information for stopping the cast rig at a desired depth, and output range setting information for changing the variable range of the output of the drive motor 8. Further, when the spool 5 is rotationally driven to feed/wind a fishing line, the line length measurement device 140 detects the actual amount of rotation and the rotation direction by, for example, a magnet attached to a rotating portion and a magnetic sensor that detects the magnet, and generates a detection signal thereof.

The motor drive circuit 160 has a function of driving and controlling the drive motor 8 that rotationally drives the spool 5. Specifically, the motor drive circuit 160 variably controls the energization time ratio (duty ratio) of the drive current on the drive motor based on a control signal (PWM signal; pulse width modulation signal) from the CPU 110, for example, to perform an increase/decrease adjustment on the drive motor 8 continuously between the stopped state (OFF state) and the high-speed rotation state (Max state). Note that, the CPU 110 outputs a control signal related to the duty ratio set for each angle based on a detection signal by the angular sensor that detects the actual amount of operation from an initial position (OFF position) of the operation member 15.

The display control circuit 150 is driven based on control of the CPU 110, and has a function of causing the display device 11 to display, to the fishing person, various kinds of information such as the amount of fishing line currently fed out, the time since the casting of the rig, the driving speed of the drive motor 8 (may be displayed by an indicator), an operation method, and a message.

The angular sensor 130 that detects the operation rotation angle of the operation member 15 has only to have a function of generating a signal corresponding to the operation angle of the operation member 15. For example, angular sensors of various structures can be employed, such as one including a potentiometer that outputs a change in resistance value according to the amount of operation of the operation member 15, one including an encoder that generates a pulse according to the amount of operation, and one incorporating a Hall sensor that detects a change in magnetic field according to the rotation angle of the operation member.

A control unit 200, which is a control system on the controller 20 side, is housed in the housing 21 and comprises a control substrate (microcomputer) 220 on which components such as a central processing unit (CPU) 210 that controls the operation of the controller 20, a read only memory (ROM) 211 that stores a transmission/reception program for transmitting/receiving information to/from the reel main body 1A, various kinds of setting information (control table), and the like, a random access memory (RAM) 212 as a temporary storage area, and a communication module 215 that transmits/receives various information signals to/from the reel main body 1A are mounted. In addition, a display control circuit 250 that causes the display device 23 to display various kinds of information is mounted on the control substrate 220.

Bluetooth (registered trademark) is used as a communication module 215 as in the communication module 115 on the reel main body side.

The control substrate 220 is configured to transmit and receive signals to and from each actuating element via an I/O port 222 and control the operation thereof. The control substrate 220 transmits and receives signals to/from an angular sensor 230 that detects the amount of operation of the operation dial 25 and the operation buttons 26 arranged in the housing 21.

The CPU 210 has a function of controlling each actuating element above to control the controller 20 by executing a predetermined program stored in the ROM 211 and supplying a control signal generated in response thereto to each actuating element via the I/O port 222.

Note that, the angular sensor 230 for detecting the operation rotation angle of the operation dial 25 has the same configuration as the angular sensor 130 on the reel main body side, which makes it easier to synchronize a drive signal generated according to the operation angle of the operation member 15 that drives the drive motor 8 on the reel main body 1A side and a drive signal generated according to the operation angle of the operation dial 25 on the controller 20 side.

According to the above configuration, information is transmitted and received between the reel main body 1A side and the controller 20 side via the communication modules 115 and 215. This makes it possible to display various kinds of information (for example, water depth information), displayed on the display device 11 on the reel main body 1A side, on the display device 23 on the controller 20 side, and perform control to drive the drive motor 8 on the reel main body 1A side at the same rotation speed as the rotation operation of the operation member 15 by the rotation operation of the operation dial 25 on the controller 20 side.

As described above, the operation dial 25 is capable of remote operation with the same function as the operation member 15 on the reel main body side. In other words, by pressing a thumb against the operation dial 25 while gripping the grip portion 22 and rotating the operation dial in this state, it is possible to remotely operate acceleration, deceleration, and stop of the drive motor of the reel main body 1A. As a result, the output of the drive motor on the reel main body side can be adjusted only by the amount of operation of the thumb (sense of the finger) of one hand without looking at the hand, and the rotation control of the drive motor can be performed in a reliable gripping state by gripping the grip portion 22.

Although different from the configuration illustrated in FIG. 1, by making the shape of the operation dial 25 on the controller side and the operation member 15 on the reel main body 1A side the same or resemblant shapes (including similar shapes), the fishing person can perform the motor control operation of the reel main body 1A, which the fishing person usually performs, with the controller 20 with the same operation feeling, and thus can perform the remote operation without feeling strange.

Next, configurations of the controller 20 and the cover member 80 will be described with reference to FIGS. 3 to 9.

As described above, the controller 20 has a shape in which it is easy to grip the controller with one hand and to rotate the operation dial 25 with its thumb. Thus, the housing 21 of the controller extends in the front-rear direction, a rear side A is a grip region, a front side B is an information display region, and an intermediate region C between both regions is an operation region. The above housing 21 can be formed of a metal material, a resin material, or the like.

The grip region A comprises the grip portion 22 having a size and a shape (such as a cross-sectional circular shape, a semicircular shape, an elliptical shape, or a semi-elliptical shape) that are easy to grip. The display device 23 and the operation buttons 26 are disposed in the information display region B, and the operation dial 25 is disposed in the intermediate region C.

The housing 21 may be formed to have the same width in the front-rear direction, but is preferably formed to satisfy W>W1, where W is a maximum width of the information display region B, which is a portion where the display device 23 is disposed, and W1 is a maximum width of the grip region A, which is the grip portion 22.

In this way, by forming the width of the information display region B that is not gripped by the user to be wider than the grip portion 22, it is possible to arrange the display device 23 and the operation buttons 26 easily and make them bigger, so that the display device 23 can be easily viewed and the pressing operation can be easily performed.

Figure 3:
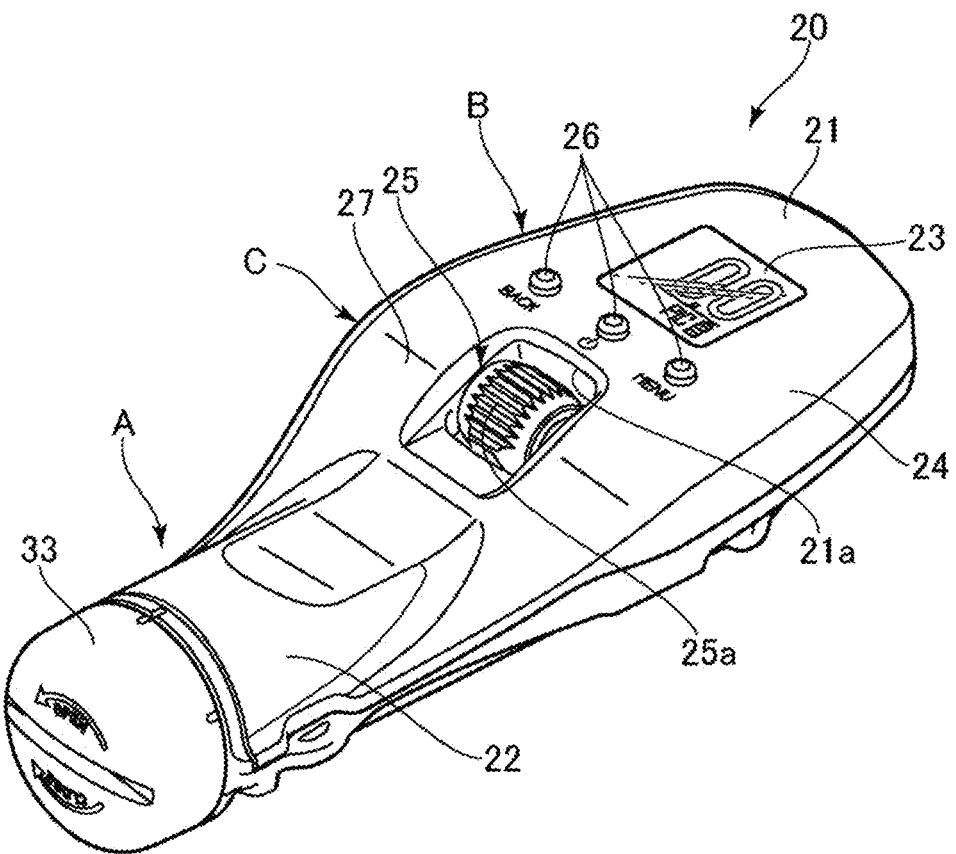
FIG. 3 is a perspective view of the controller as viewed from above.
Figure 5:
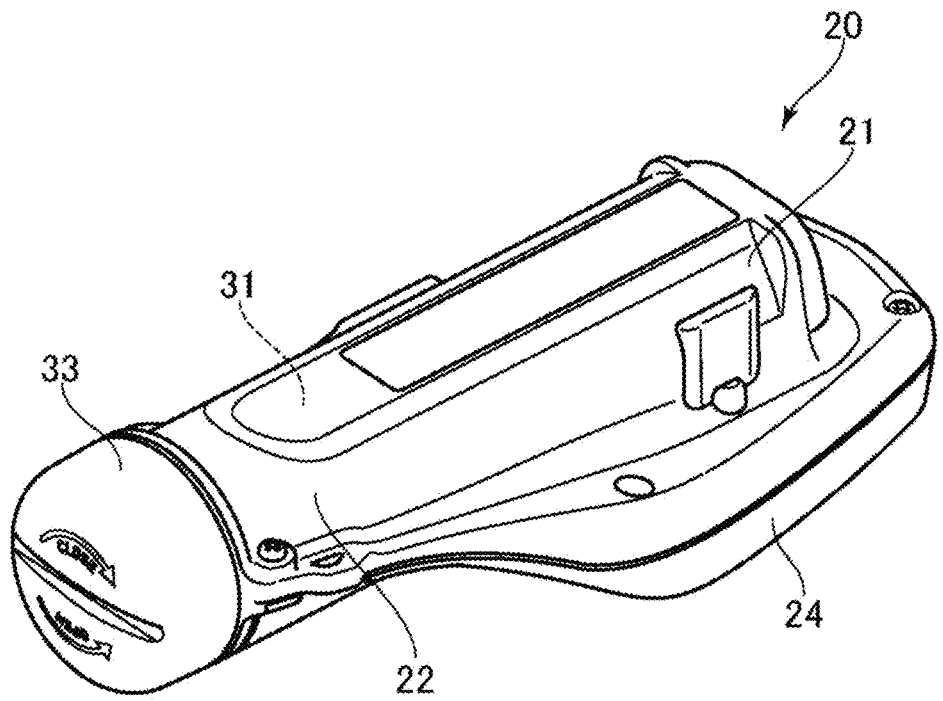
FIG. 5 is a perspective view of the controller as viewed from below.
Figure 6A:
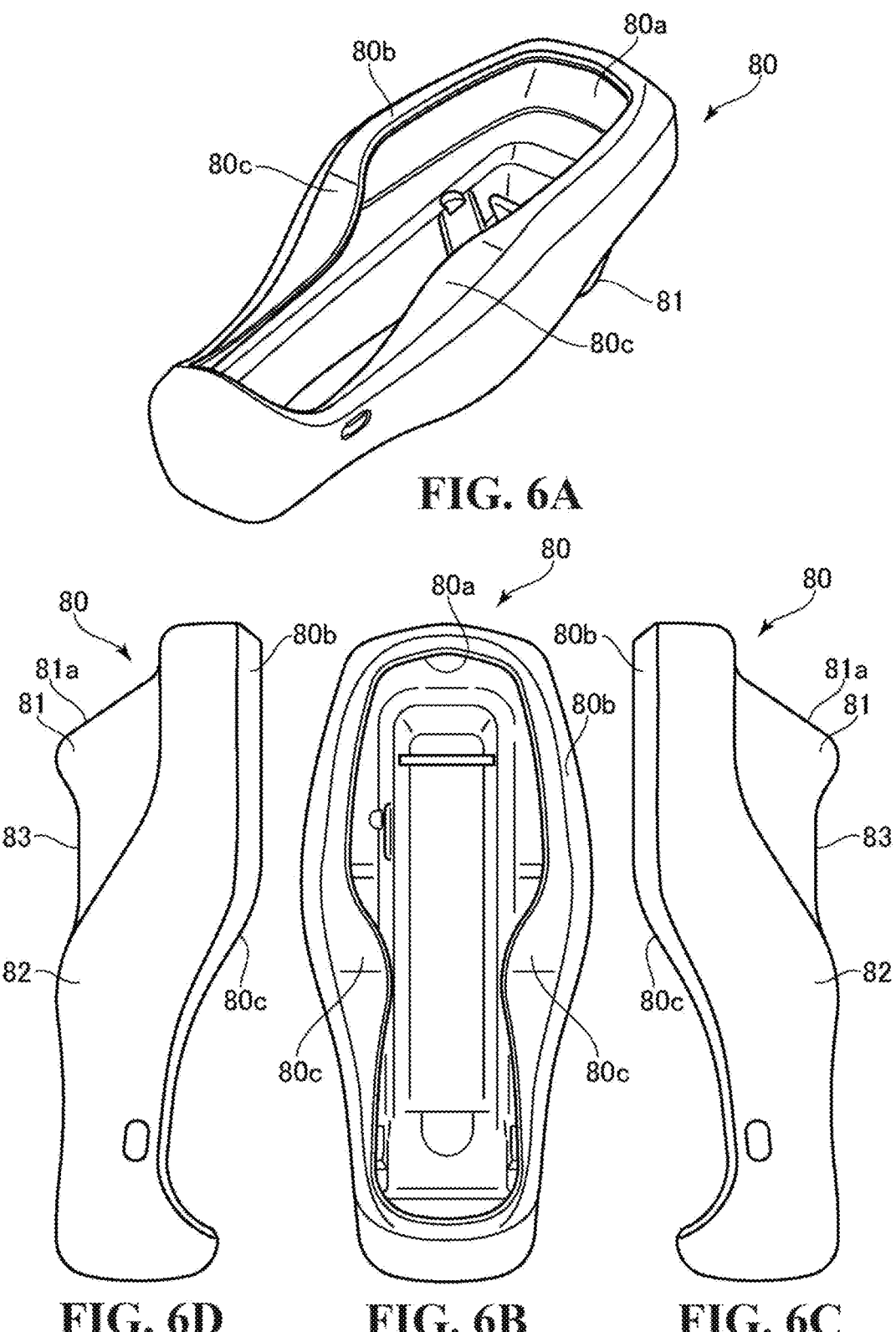

Further, in the information display region B, as illustrated in FIGS. 3 and 5, the grip portion 22 having a substantially cylindrical shape is extended forward seamlessly, and a box-shaped control case 24 having a wide width in the left-right direction is formed on an upper surface of a front region of the grip portion 22. The control case 24 above may be integrated with the grip portion 22 as a separate structure or may be integrally formed with the housing 21.

Figure 8:
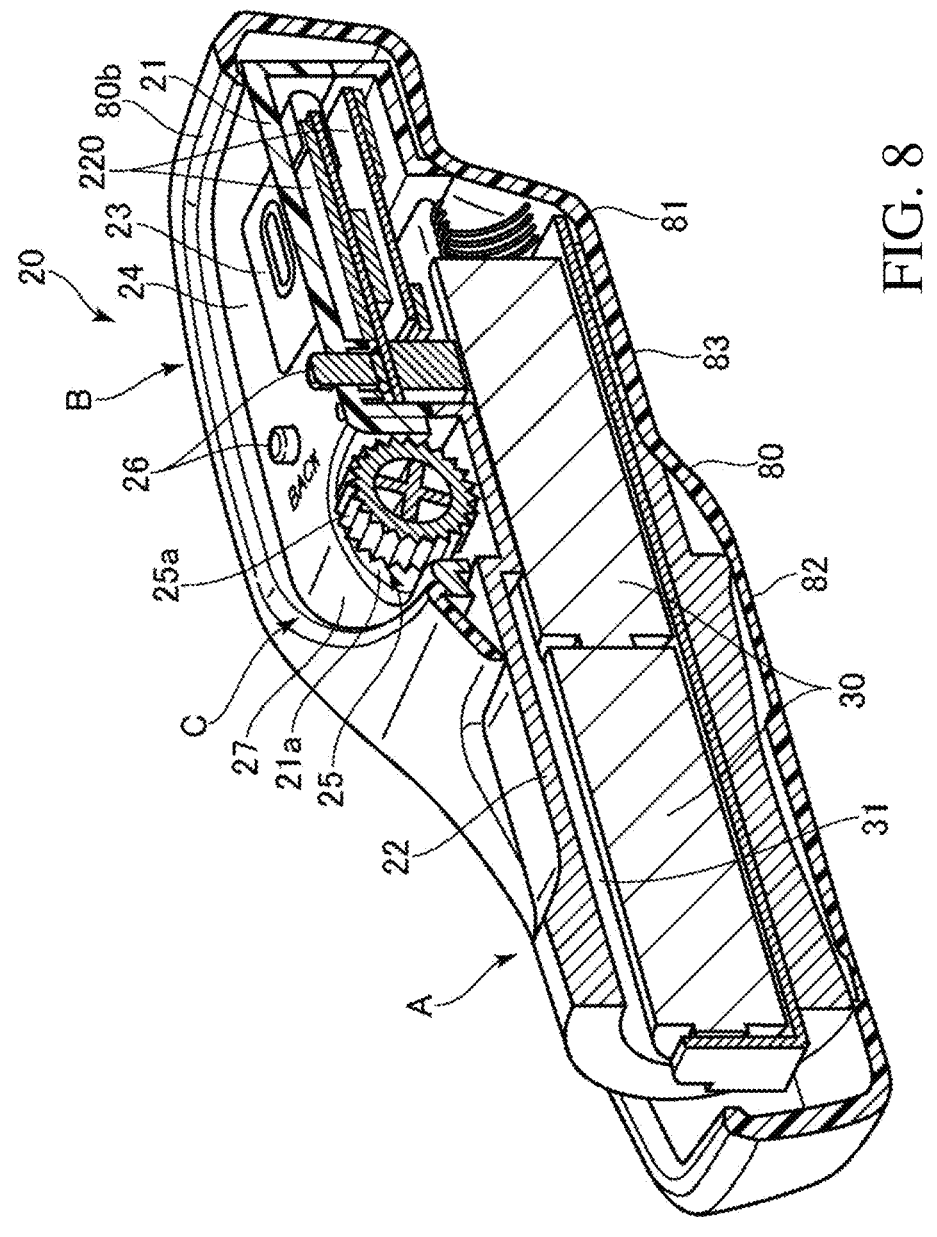
FIG. 8 is a diagram illustrating an internal structure of the controller.

In addition, as illustrated in FIG. 8, the control substrate 220 on the controller 20 side is disposed in the information display region B, larger than the grip portion 22 of the housing 21, and is disposed so as to overlap with the display device 23, thereby efficiently utilizing the space. In order to save space, the control substrate 220 may be arranged such that its function is dispersed into multiple control substrates and these substrates overlap with each other in the up-down direction.

An upper surface side of the housing 21 may have a flat shape. In the present embodiment, an inclined portion 27 rising toward the display device 23 is formed in a region from the grip portion 22 to the display device 23, and a substantially rectangular opening 21a is formed in the inclined portion 27. In other words, the opening 21a is formed in the inclined portion 27, and the operating part 25a of the operation dial 25 is exposed from the inclined opening 21a.

Figure 9:
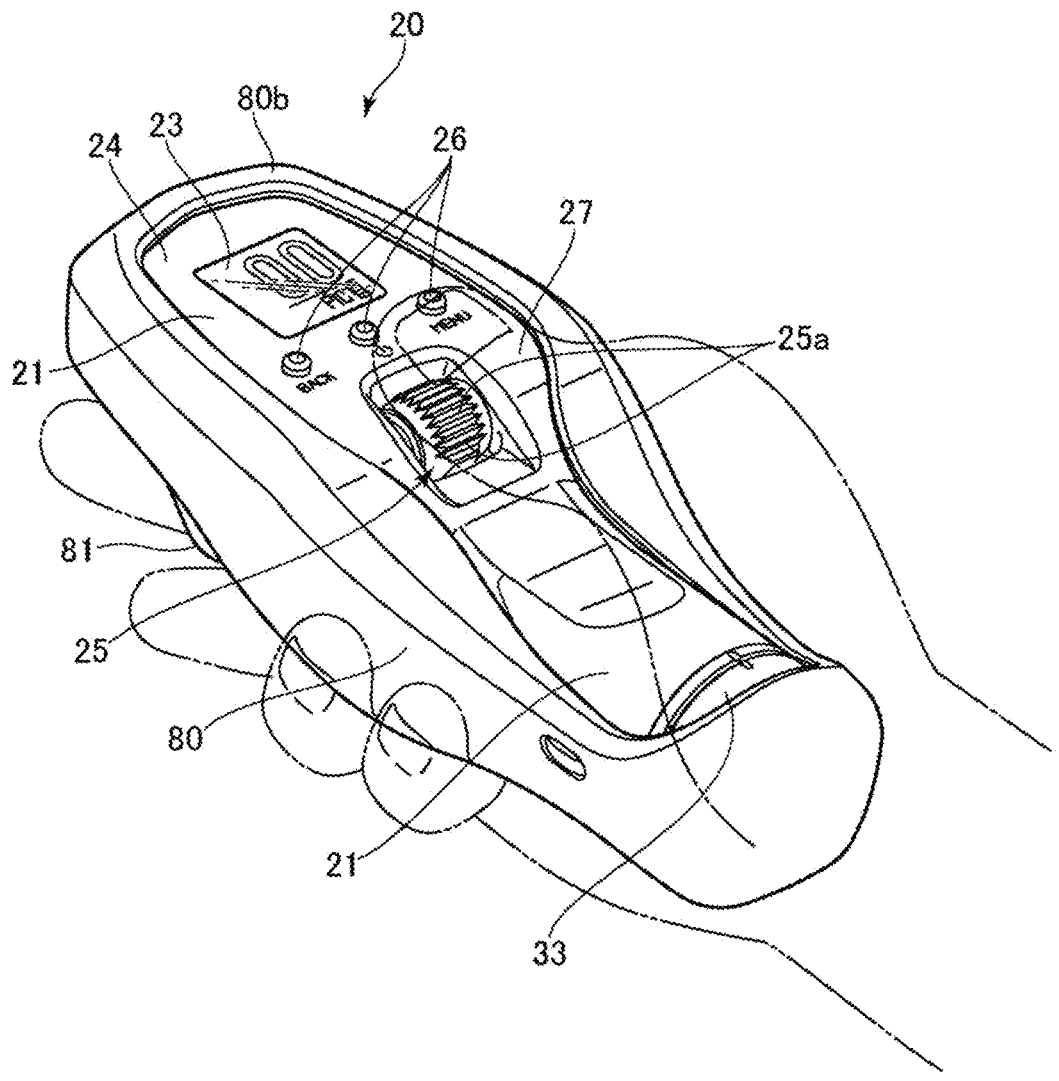
FIG. 9 is a perspective view illustrating an operation example of the controller.

In this manner, by forming the inclined portion 27 in the housing 21 and exposing the operating part 25a of the operation dial 25 in the inclined portion 27, as illustrated in FIG. 9, it is possible to press the operating part 25*a* by extending the thumb forward while gripping the grip portion 22, and thus possible to facilitate the rotation operation of the operation dial 25.

Further, the operation dial 25 may be formed at any position in the width direction of the housing, but is preferably disposed so that the operating part 25*a* is positioned on the center line in the width direction of the housing 21. In other words, by disposing the operation dial 25 at the center position which is equidistant from the left and right of the housing, operability and mountability of the operation dial 25 can be improved, and irrespective of whether the grip portion 22 is gripped with the right or left hand, it is possible to rotate the operation dial 25 with the same sense.

Figures 4A, 4B, 4C, 4D, 4E:
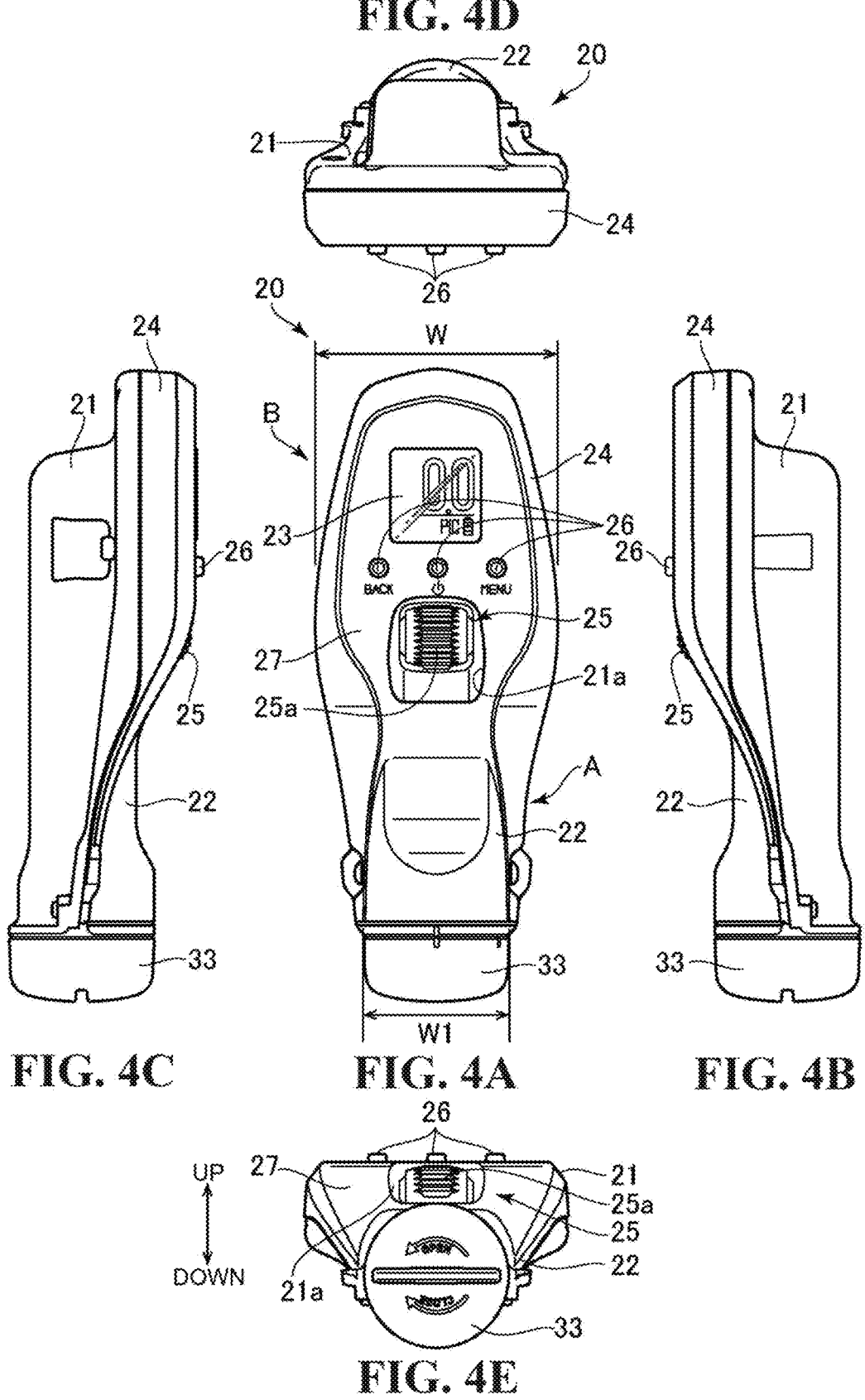
FIGS. 4A to 4E are a plan view, a right side view, a left side view, a front view, and a rear view of the controller illustrated in FIG. 3, respectively.

The operation dial 25 is preferably disposed so that at least a part, preferably the whole, of the operating part 25*a* is retracted from the surface of the housing 21. In other words, the operation dial 25 is supported at a position embedded in the housing 21, and in the side view, the operation dial is supported in a state where the operating part 25*a* does not protrude from the surface of the housing 21 or in a state where a part thereof protrudes as illustrated in FIGS. 4C and 4D.

According to such an arrangement mode of the operation dial 25, the operation dial 25 becomes less likely to come into contact with other objects, for example, when the controller 20 is housed in a pocket, a bag, or the like and not in use, thus preventing malfunction.

As illustrated in FIG. 8, multiple (two) AA dry batteries 30 serving as power supplies (batteries) are housed in the housing 21. In the present embodiment, a battery box 31 is disposed and incorporated in the grip portion 22 of the housing 21, and this portion preferably does not have a large diameter. The battery box 31 houses the batteries 30 from the grip region A to the information display region B (along the length direction of the housing 21) so that the overall weight balance is not biased in the front-rear direction.

Note that, the battery box 31 can be opened and closed by a cap-type lid body 33, which can be attached and detached by rotation operation, provided at the rear end of the housing 21. Alternatively, a plate-shaped opening and closing lid to be engaged with and disengaged from a back surface of the housing 21 may be provided to open and close the battery box 31. In addition, the battery may be a rechargeable power supply pack.

As described above, it is preferable to attach the cover member 80 to the controller 20. The cover member 80 of the present embodiment is formed separately from the housing 21 and formed of an elastic member such as silicone rubber.

As illustrated in FIGS. 6A to 6D, in the cover member 80, a recess 80*a* in which the housing can be housed is formed, and a close contact piece 80*b* that comes into close contact with the housing 21 so as to cover an outer edge region of an upper surface thereof when the housing 21 is housed in the recess is formed. In other words, when the housing 21 is housed in the recess 80*a* of the cover member 80, as illustrated in FIGS. 7A to 7C, a range from a side surface region to a lower surface region of the housing 21 is covered, and an outer edge region of the upper surface of the housing 21 is covered.

Note that, as for the close contact piece 80*b*, as illustrated in FIGS. 7A to 7C, as long as the display device 23, the operation dial 25, and the operation buttons 26 can be exposed, how to cover the outer edge of the housing 21 is not limited.

By mounting the cover member 80 made of silicone rubber as described above to the housing 21, sea water becomes less likely to enter the inside of the housing 21 and an impact is alleviated even if the housing hits another object, so that the controller 20 can be prevented from being damaged. In addition, since the cover member 80 has a higher friction coefficient than the housing 21, for example, even when the cover member is placed on a ship edge, positional displacement does not easily occur, so that it is possible to visually recognize the water depth indication of the display device 23 stably.

The cover member 80 is preferably formed so that a periphery of the operation dial 25 is higher than the operating part 25*a* of the operation dial 25. For example, by thickening both side portions 80*c* of the operation dial 25 in the close contact piece 80*b*, the operating part 25*a* can be prevented from protruding from the cover member 80 in the side view, and thus can be prevented from touching another peripheral member and being operated erroneously.

Alternatively, protrusions (wall portions) may be formed on the surface of the cover member 80, for example, the surface of the close contact piece 80*b* so that the operating part 25*a* does not protrude therefrom. Such protrusions (wall portions) may be provided at least at two points on the diagonal line with the operation dial 25 as the center. By forming the protrusions so that they surround the entire circumference of the operation dial 25, erroneous operation can be reliably prevented. In this case, in consideration of the operability of the operation dial 25, it is preferable not to provide any protrusion (wall portion) in the direction in which the thumb is pressed.

Note that, the protrusions (wall portions) that suppress upward protrusion of the operation dial 25 as described above may be formed around the opening 21*a* of the housing 21 of the controller 20 or may be provided on both the housing 21 and the cover member 80. Further, the operation dial 25 may comprise a sinking structure by deeply recessing the inside of the opening 21*a*.

In addition, on a back surface of the cover member 80 (back surface with respect to the operation member 25), it is preferable to form a latch portion that allows an index finger to be hooked thereon when the grip portion 22 is gripped.

For example, as illustrated in FIGS. 6A to 7C, by forming a convex portion 81 on a front side of a back surface of the cover member 80, a front surface 81*a* of the convex portion 81 can be configured as a latch portion.

Alternatively, by forming a convex portion 82 behind the convex portion 81 at a position away from the convex portion 81, the space between the convex portions 81 and 82 serves as a concave portion 83, and the index finger can be hooked on this portion.

In this manner, by forming the latch portion (the front surface 81*a*, the concave portion 83) on the back surface of the cover member 80, it is possible to grip the grip portion 22 firmly by hooking the index finger thereon, so that the gripped state is stabilized and the controller 20 can be prevented from falling off.

Note that, the latch portion as described above may be formed on the back surface of the housing 21 (the back surface with respect to the operation member 25), and its shape, arrangement position, and the like can be appropriately changed as long as an index finger can be hooked thereon.

In addition, it is preferable to form, on the back surface of the cover member 80, protrusions that are separated from each other in the front-rear direction and abut on an installation surface (a ship edge, a chair, various structural parts, and the like).

In the present embodiment, the convex portions 81 and 82 constituting the latch portion described above constitute protrusions, and these protrusions enable a stable placement state.

Note that, the protrusions as described above may be formed on the housing 21, and can be appropriately changed in shape, arrangement position, height, and the like. Further, the positions where the convex portions 81 and 82 are formed are set so that the concave portion 83 between the convex portions 81 and 82 is located on the back surface side corresponding to the display device 23, whereby the display device 23 can be visually recognized stably.

In the present embodiment, the power source for driving the controller 20 is configured in such a way that the cap-type lid body 33 is provided at the rear end of the housing 21 to open and close the battery box 31, and thus the lid body 33 may be exposed at the rear end of the cover member 80. In other words, by forming the cover member 80 so that a portion at which to replace the batteries (the lid body or the like) is exposed therefrom, the battery can be replaced while the cover member is attached, so that replacement work at the time when the power supply is shut off can be easily performed.

The cover member 80 configured as described above may comprise a configuration integrally attached to the surface of the housing 21 instead of mounting a member, provided separately from the housing 21, to the housing.

According to the controller 20 described above, the following operations and effects can be obtained.

Usually, in boat fishing using an electric fishing reel, a fishing person visually checks bending of a rod or sensuously adjusts output of a drive motor while feeling a load on the hands. In this case, some fishing persons (fishermen) need to adjust the output while performing some work (maneuvering, eating snacks, preparation of a rig, maintenance, etc.), and fish slime or bait is often attached to a finger used for operation.

According to the controller 20 of the present embodiment, a person visually observes the state of a rod tip at a separated position, and as illustrated in FIG. 9, has only to extend his/her thumb while gripping the housing 21 and sensuously rotate the operation dial 25. Thus, it is possible to remotely and reliably adjust the output of the drive motor easily by gripping the controller 20.

Meanwhile, in fishing in a deep place, it may take nearly one hour from the casting of a rig to the collection thereof each time. In such a case, there are cases where the ship is steered while a rig is released (a releasing mode by rotating the drive motor in the reverse direction), or the next bait as a rig is prepared while the fishing line is wound up, for example. Under such a situation, the fishing line may be entangled with a rig released from another fishing rod. Since the output of the drive motor can be adjusted remotely while viewing the state of the rod tip by the controller 20 described above, releasing and winding of the fishing line can be immediately stopped when a line trouble or the like occurs.

Further, in a state where there is a rig in the sea, the rig may be out of the fish location, so that it is necessary to periodically grasp the water depth. Since the controller 20 described above can be stably placed on the ship edge or the like, it is possible to stably grasp the water depth even on a bumpy ship.

Next, other embodiments of the controller will be described.

Note that, in the embodiments to be described below, the same components as those of the controller of the first embodiment described above are denoted by the same reference numerals, and a detailed description thereof is omitted.

Figures 10A, 10B, 10C, 10D, 10E:
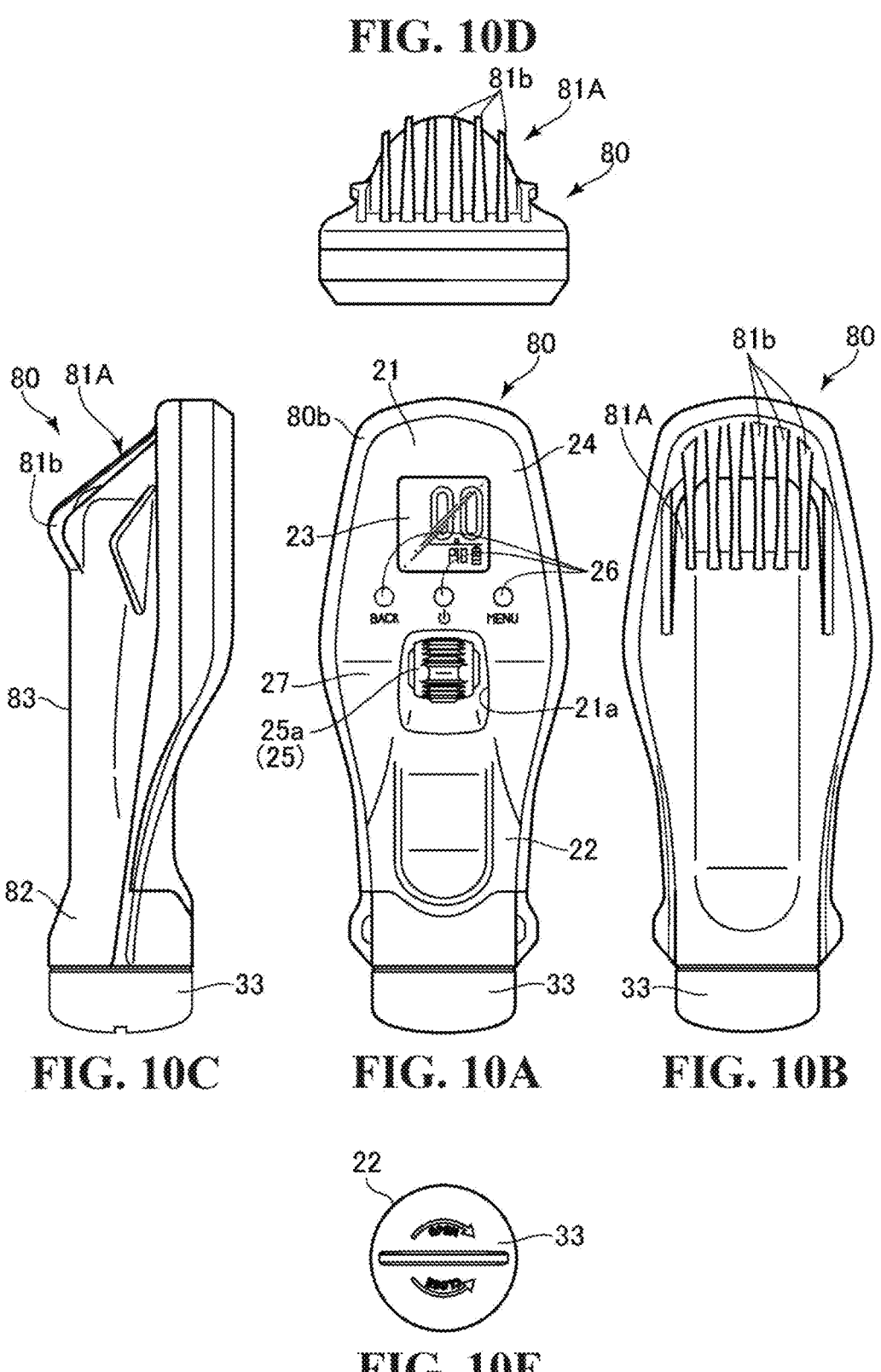

FIGS. 10A to 10E are views illustrating a controller and a cover member according to a second embodiment, in which FIG. 10A is a plan view, FIG. 10B is a rear view, FIG. 10C is a left side view, FIG. 10D is a front view, and FIG. 10E is a rear view.

In the second embodiment, the latch portion which is formed on the back surface of the cover member 80 and on which an index finger is hooked is formed of a convex portion 81A in which a large number of flanges 81b adjacent along the width direction are formed.

According to such a convex portion 81A, the frictional force is increased by the large number of flanges 81b. Thus, when a finger is hooked, the finger is less likely to slip off and the gripped state is stabilized. In addition, when the controller is placed on a ship edge or the like, the controller is less likely to slip and the stable placement state can be obtained. Further, when the cover member 80 is integrally molded by a mold, the flanges makes distortion or the like due to heat shrinkage hardly occur, and the appearance of the cover member 80 can be beautifully finished.

FIGS. 11A and 11B are views illustrating a controller and a cover member according to a third embodiment, in which FIG. 11A is a plan view and FIG. 11B is a right side view.

In the third embodiment, the grip region A, the information display region B, and the intermediate region C of the housing 21 are formed to have substantially the same length. In addition, a portion corresponding to the grip region A of the cover member 80 is embossed to form a large number of uneven portions 85.

By forming such uneven portions 85, the gripping property can be further improved.

In addition, the operation member disposed in the housing 21 is constituted by a slide body 25A that is disposed so as to be slidable in the front-rear direction in the opening 21a formed in the housing 21. For example, such a slide body 25A is configured so that the rear end in the opening 21a serves as an initial position (output of the drive motor is 0), and the output of the drive motor can be adjusted by pressing the abdomen of a thumb against the operating part 25b on the surface and sliding the slide body 25A forward.

In this way, the output of the drive motor can be adjusted by the sense of the amount of operation of the thumb without looking at the slide body 25A in the state of gripping the housing 21, and thus the operability can be improved. Note that, in such a configuration, it is preferable to form a latch protrusion 25c so that the thumb is hooked on the operating part 25b of the slide body 25A.

FIGS. 12A and 12B are views illustrating a controller and a cover member according to a fourth embodiment, in which FIG. 12A is a plan view and FIG. 12B is a right side view.

In the fourth embodiment, the housing 21 comprises the grip region A (the grip portion 22) and the information display region B (the control case 24), and an operation member 25B is disposed in the information display region B.

The back surface side of the cover member 80 is embossed so as to comprise the large number of uneven portions 85 and an inclined surface (latch portion) 81c on which a finger can be hooked is formed on the front end side thereof, and the back surface of the cover member 80 is formed of a flat surface 80c.

According to such a configuration, the gripping property can be improved, and the placement state of the housing 21 is stabilized by installing the flat surface 80c on the placement surface such as the ship edge.

In addition, the operation member disposed in the housing 21 is configured by a swing body 25B that is swung in the opening 21a formed in the housing 21. For example, the swing body 25B is configured to increase the output of the drive motor by pressing a front-side region (ON side) 25c in the opening 21a, and to decrease the output of the drive motor by pressing a rear-side region (OFF side) 25d in the opening.

As described above, since the output of the drive motor can be adjusted only by displacing the position of a thumb pressed against the swing body 25B, the output of the drive motor can be adjusted by the sense of swinging the swing body 25B, and thus the operability can be improved.

Note that, in the present embodiment, a threaded hook member 40 is attached to the rear end of the housing 21, which enables the controller 20 to be attached to clothes of the fishing person, the structure of a fishing boat, or the like directly or via a strap. According to this configuration, the controller 20 is prevented from being lost or falling (falling into water). In addition, the control case 24 may be configured to be rotatable with respect to the grip portion by a tilt mechanism so that the display device 23 can be visually recognized easily.

Figures 13A, 13B:
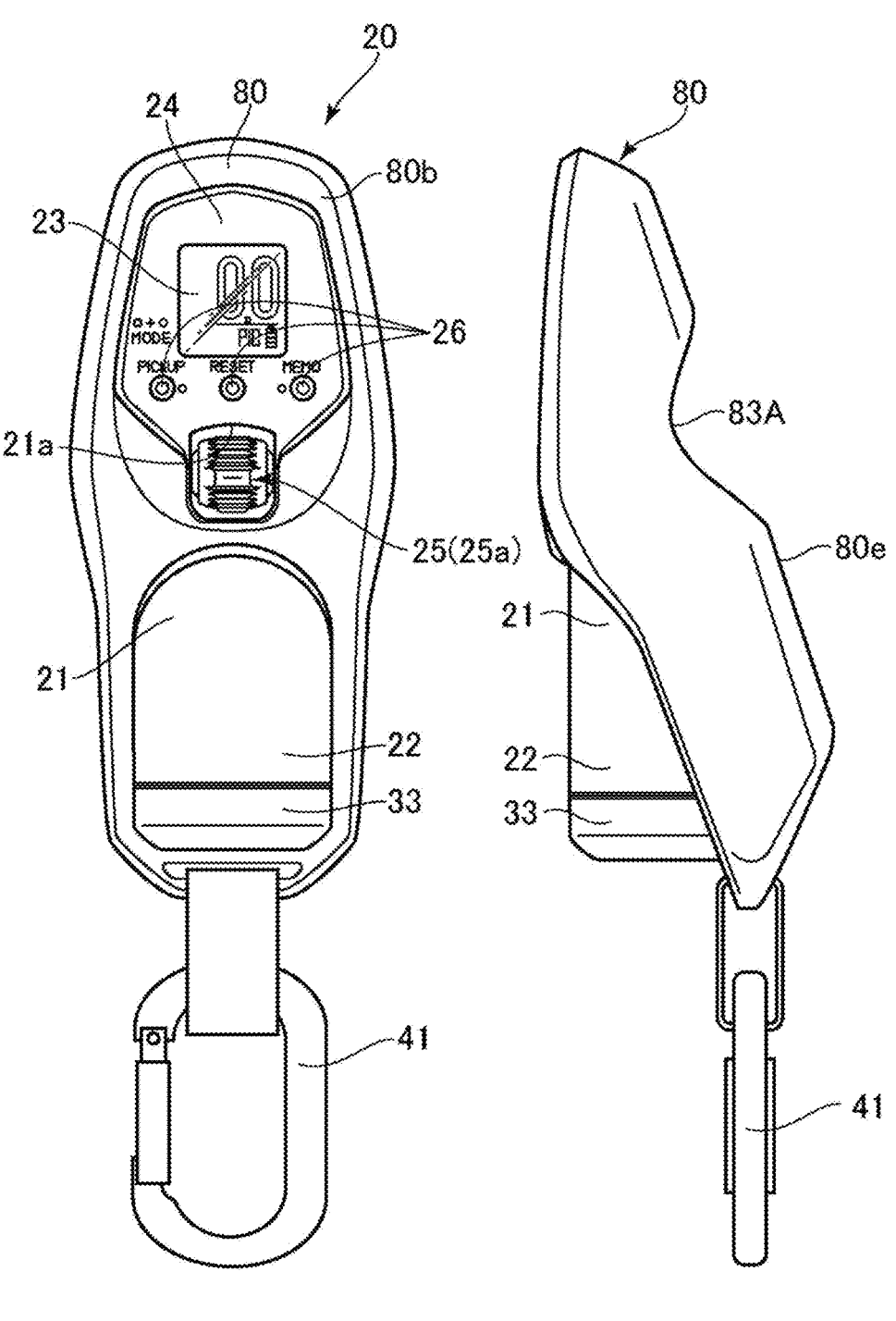

FIGS. 13A and 13B are views illustrating a controller and a cover member according to a fifth embodiment, in which FIG. 13A is a plan view and FIG. 13B is a right side view.

The cover member 80 of the fifth embodiment is formed so that a back surface 80e is inclined, and a concave portion 83A on which an index finger can be hooked is formed in an intermediate portion thereof.

In this manner, the shape of the back surface side of the cover member 80 can be appropriately deformed according to the placement surface on which the cover member is to be placed, and the cover member 80 can be configured to be suitable for the use condition.

Note that, in the present embodiment, a carabiner-type hook member 41 is attached to the rear end of the housing 21, and can be easily hooked on another object.

FIGS. 14A and 14B are views illustrating a controller and a cover member according to a sixth embodiment, in which FIG. 14A is a plan view and FIG. 14B is a right side view.

In the housing 21 of the sixth embodiment, the operation dial 25 is disposed below the display device 23 with no inclined portion in the intermediate portion. In addition, in the cover member 80, convex portions 81B and 82B are formed on the front end side and the rear end side of a back surface 80f, and the intermediate portion is configured by a flat concave portion 83B extending in the vertical direction.

According to such a cover member, it is possible to grip the concave portion 83B firmly with a middle finger, a ring finger, and a little finger and hook an index finger on the inclined surface (latch portion) 81c on the front side of the convex portion 81A, so that the gripping state of the controller 20 is stabilized.

Figure 15:
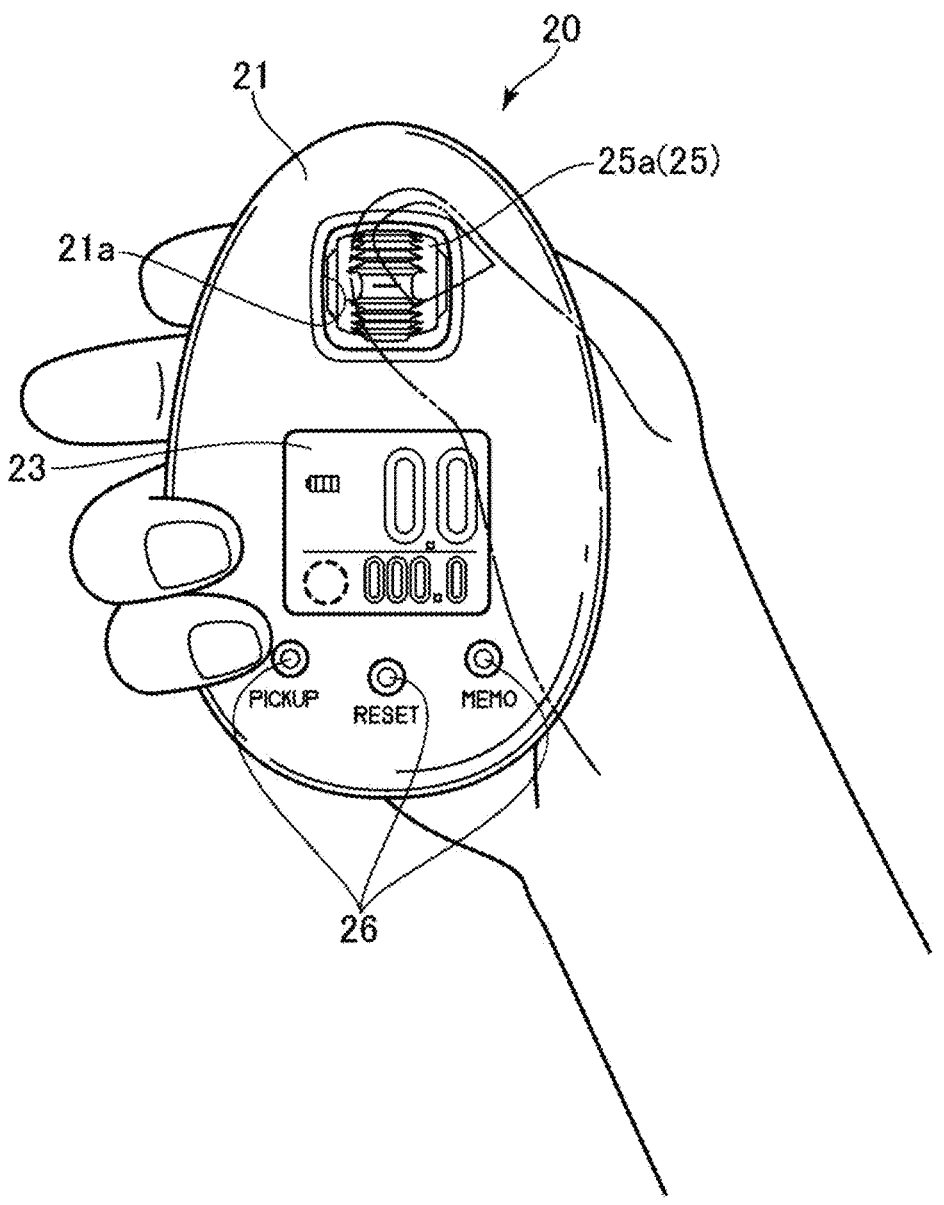
FIG. 15 is a view illustrating a controller according to a seventh embodiment.

FIG. 15 is a view illustrating a controller according to a seventh embodiment.

The housing 21 of the controller of each of the above-described embodiments has a configuration in which the grip region A (the grip portion 22), the information display region B (the control case 24), and the inclined portion 27 are formed. However, in the seventh embodiment, a shape in which the entire housing 21A serves as a pinched portion, for example, is formed in an egg shape so that the housing can be wrapped and gripped by a palm. However, besides the egg shape, the shape of the housing can be appropriately deformed. In addition, the arrangement position of the display device 23 can be appropriately changed, such as below the operation dial 25.

According to the housing of this configuration, the entire housing becomes compact, and thus can be easily housed in a pocket of a fishing person or the like.

The embodiments of the present invention have been described above, but the present invention is not limited to the above embodiments and may be modified in various ways.

The configurations of the housing 21 and the cover member 80 can be appropriately modified according to the usage mode. In addition, when the operation member for adjusting the drive motor installed in the housing 21 is formed of a rotating body, the operation member can be formed in a form other than the above-described dial form. For example, its shape and operation mode are not limited, such as a lever form and a stick form, as long as the rotation operation (turning operation) can be performed. In addition, the slide body and the swing body can be appropriately deformed as long as they are moved in one direction by sliding a thumb in one direction or shifting its position.

The controller 20 may be configured to be capable of remote operation other than the adjustment of the output of the drive motor on the reel main body side. For example, various operations performed on the reel main body side, such as alarm setting (ON/OFF, tone, interval), screen display setting (two-stage display or the like), swinging/timer winding-up setting (motor time control), drive mode switching setting (winding-up setting at a constant speed), a float fishing mode, electronic drag sound, drag force adjustment, clutch ON/OFF switching operation, and gear ratio switching at the time of winding-up, may be performed on the controller side. Further, in the present embodiment, one controller 20 is configured to be able to remotely operate one electric fishing reel, but may be configured to be able to remotely operate multiple electric fishing reels.

Furthermore, the components in the above-described embodiments may be implemented in combination as appropriate.

What is claimed is:

1. A controller capable of remotely operating an electric fishing reel, wherein
the controller comprises a housing comprising a grip portion that can be gripped by a user,
the housing is provided with a display device and an operation member that enables the user to remotely operate the electric fishing reel, and
the operation member is constituted by any one of a rotating body, a slide body, and a swing body.

2. The controller according to claim 1, wherein a cover member from which the display device and the operation member are exposed is attached to the housing.

3. The controller according to claim 2, wherein the housing or the cover member is formed so that a periphery of the operation member is higher than an operating part.

4. The controller according to claim 2, wherein a latch portion that allows an index finger to be hooked thereon when the user grips the grip portion is formed on a back surface of the housing or the cover member with respect to the operation member.

5. The controller according to claim 4, wherein the latch portion is formed of a concave portion.

6. The controller according to claim 2, wherein, on a back surface of the housing or the cover member, there are protrusions that are separated from each other in a front-rear direction of the housing and abut on an installation surface.

7. The controller according to claim 1, wherein the housing comprises an inclined portion that rises toward the display device in a region from the grip portion to the display device, and the operation member is installed in the inclined portion.

8. The controller according to claim 1, wherein an operating part of the operation member is located on a center line in a width direction of the housing.

9. The controller according to claim 1, wherein the operation member is disposed so that at least a part of an operating part of the operation member is retracted from a surface of the housing.

10. The controller according to claim 1, wherein the housing is formed to satisfy W>W1 where W is a width of a portion where the display device is disposed and W1 is a width of a portion of the grip portion.

11. The controller according to claim 1, wherein the housing comprises a battery box that houses a plurality of dry batteries along a front-rear direction of the housing.

12. A controller capable of remotely operating an electric fishing reel, wherein the controller comprises a housing comprising a grip portion that can be gripped by a user, the housing is provided with a display device and an operation member that enables the user to remotely operate the electric fishing reel, and the operation member is disposed so that at least a part of an operating part of the operation member is retracted from a surface of the housing.

13. A controller capable of remotely operating an electric fishing reel, wherein the controller comprises a housing comprising a grip portion that can be gripped by a user, the housing is provided with a display device and an operation member that enables the user to remotely operate the electric fishing reel, and the housing is formed to satisfy W>W1 where W is a width of a portion where the display device is disposed and W1 is a width of a portion of the grip portion.

14. A controller capable of remotely operating an electric fishing reel, wherein the controller comprises a housing comprising a grip portion that can be gripped by a user, the housing is provided with a display device and an operation member that enables the user to remotely operate the electric fishing reel, a cover member from which the display device and the operation member are exposed is attached to the housing, and on a back surface of the housing or the cover member, there are protrusions that are separated from each other in a front-rear direction of the housing and abut on an installation surface.

* * * * *